United States Patent Office 3,536,657
Patented Oct. 27, 1970

3,536,657
MIXTURES OF POLYARYLENE POLYETHERS AND SILOXANE-POLYARYLENE POLYETHER COPOLYMERS
Allen Noshay, East Brunswick, Markus Matzner, Edison, Bruce P. Barth, Somerville, and Richard K. Walton, Millington, N.J., assignors to Union Carbide Corporation, a corporation of New York
No Drawing. Continuation-in-part of application Ser. No. 714,808, Mar. 21, 1968. This application June 17, 1968, Ser. No. 737,320
Int. Cl. C08g 47/10
U.S. Cl. 260—37
10 Claims

ABSTRACT OF THE DISCLOSURE

Siloxane-polyarylene polyether copolymers are blended with thermoplastic polyarylene polyethers to yield mixtures characterized by improved notched impact strength and improved resistance to environmental stress cracking.

This application is a continuation-in-part of copending application, Ser. No. 714,808 filed Mar. 21, 1968, now abandoned.

BACKGROUND

This invention relates to mixtures of polyarylene polyethers and siloxane-polyarylene polyether copolymers characterized by improved notched impact strength and improved resistance to environmental stress cracking.

Polyarylene polyethers are substantially linear thermoplastic polymers that exhibit excellent mechanical physical, chemical and electrical properties, and are especially attractive for their superior thermal properties. These polymers can be molded by conventional techniques into shaped articles for a wide variety of end uses. These polymers are ductile, machinable, self-extinguishing and non-dripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers undergo undesirable environmental stress cracking. That is, load bearing or stressed articles molded from polyarylene polyethers will crack and craze when exposed to certain liquid environments such as solvents and the like. In addition, it has also been found that polyarylene polyethers are notch sensitive, that is, they exhibit relatively low Izod Impact (ASTM D256) values as compared to other engineering thermoplastic materials such as polycarbonates for example.

SUMMARY

Unexpectedly, it has now been discovered that polyarylene polyethers are greatly improved in notched impact strength and resistance to environmental stress cracking by adding thereto from about 0.1 to about 99.9 percent by weight, preferably from about 1 to about 50 percent by weight of a siloxane-polyarylene polyether copolymer. The aforementioned percent by weight is based on the total weight of polyarylene polyether and said copolymer. Of note is the fact that the incorporation of these copolymers in polyarylene polyethers does not adversely effect the desirable properties of the polyarylene polyether.

DESCRIPTION

Thermoplastic polyarylene polyethers used in the present invention are described in U.S. Patent 3,264,536, issued Aug. 2, 1966 and are linear thermoplastic polymers having a basic structure composed of recurring units having the formula $$-O-E-O-E'- \qquad (1)$$

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis(4-hydroxyphenyl)-propane, 1,1-bis-(4-hydroxyphenyl)-2-phenylethane, bis-(4 - hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenol groups are bound to the same of different carbon atoms of an organic linking group.

Such dinuclear phenols can be characterized as having the structure:

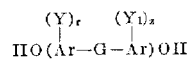

wherein Ar is an aromatic group and preferably is a phenylene group, Y and Y₁ can be the same or different inert substituent groups as alkyl groups having from 1 to 4 carbon atoms, halogen atoms, i.e., fluorine, chlorine, bromine, or iodine, or alkoxy radicals having from 1 to 4 carbon atoms, r and z are integers having a value of from 0 to 4 inclusive, and G is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-(dihydroxydiphenyl)methane,
bis-(2-hydroxyphenyl)methane,
bis-(4-hydroxyphenyl)methane,
bis-(4-hydroxy-2,6-dimethyl-3-methoxyphenyl)methane,
1,1-bis-(hydroxyphenyl)ethane,
1,2-bis-(4-hydroxyphenyl)ethane,
1,1-bis-(4-hydroxy-2-chlorophenyl)ethane,
1,1-bis(3-methyl-4-hydroxyphenyl)propane,
1,3-bis(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis(4-hydroxyphenyl)-1,1,1,3,3,3-hexafluoro-propane
and the like;

Di(hydroxyphenyl)sulfones such as bis-(4-hydroxyphenyl) sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis-(4 - hydroxy-3-chlorophenyl)ether, bis-(4-hydroxy-3-chlorophenyl)ether, bis - (4-hydroxy-3-fluorophenyl)ether, bis-(4-hydroxy-3-bromophenyl)ether, bis - (4-hydroxynaphthyl)ether, bis -(4-hydroxy-3-chloronaphthyl)ether, 4,4' - dihydroxy - 3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus, when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring of polynuclear where they are attached to different benzenoid rings, as long as there is the activating electron withdrawing group in the ortho or para positions of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the srtong activating groups such as the sulfone group (—CO₂—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49, 273 (1951) and Quart, Rev., 12, 1 (1958).

The electron withdrawing group of the dihalobenzenoid compound can function either through the resonance of the aromatic ring, as indicated by those groups having a high sigma* value, i.e., above about +0.07 or by induction as in perfluoro compounds and like electron sinks.

Preferably the activating group should have a high sigma* value, preferably about 1.0 although sufficient activity is evidenced in those groups having a sigma* value above 0.7.

The activating groups can be basically either of two types:

(a) Monovalent groups that activate one or more halogens on the same ring as a nitro group, phenylsulfone, or alkylsulfone, cyano, trifluoromethyl, nitroso, and hereto nitrogen as in pyridine.

(b) Divalent groups which can activate displacement of halogens on two different rings, such as the sulfone group —SO₂—; the carbonyl group —CO—; the vinyl group —CH=CH—; the sulfoxide group —SO—; the ago group —N=N—; the saturated fluorocarbon groups —CO₂—CF₂—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula:

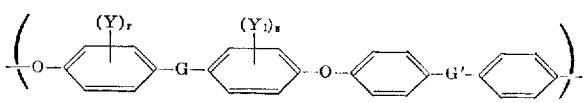

wherein G represents a member of the group consisting of a bond between aromatic carbon atoms and a divalent connecting radical and G' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups from 1 to 4 carbon atoms and and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, G is divalent connecting radical G"—C—G" wherein G" represents a member of the group consisting of hydrogen, lower alkyl, lower aryl, and the halogen substituted groups thereof, and G' is a sulfone group.

Thermoplastic polyarylene polyethers described herein can be prepared as described in the above mentioned U.S. Pat. No. 3,264,536, in a substantially equimolar one-step reaction of a double alkali metal salt of a dihydric phenol with a dihalobenzeneoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared as in Example 1 herein and as described in the aforementioned U.S. Pat. No. 3,264,536, in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

The copolymers used in this invention are siloxane-polyarylene polyether block copolymers comprising (A) At least one siloxane chain having at least two siloxane units represented by the formula:

(2)

wherein R is a monovalent hydrocarbon group, a divalent organic group or ether oxygen (—O—) and $b$ has a value of from 1 to 3 inclusive and (B) At least one linear thermoplastic polyarylene polyether chain composed of recurring units having the formula

—O—D—O—D'—   (3)

wherein D is the residuum of a dihydric phenol and D' is the residuum of benzenoid compound having an inert election withdrawing group ortho and para to the valence bond, both of said residua being valently bonded to the ether oxygens through aromatic carbon atoms.

The siloxane chain and the polyarylene polyether chains are linked by a carbon to silicon bond where R is a divalent organic group or by an aryloxy to silicon bond when R is ether oxygen.

The copolymers used in this invention can be two phase materials depending on the molecular weights of the siloxane and polyarylene polyether chains in the copolymer.

The two phase copolymers have two glass transition temperatures characteristic of two phase systems. The two phase copolymer is a microscopic two phase system. The two phases in the copolymer are microscopic because a film formed from the copolymer is transparent and will not reflect visible light as compared to a film formed from an incompatible polymer mixture which is cloudy (translucent) and will reflect visible light.

The mixture is a two phase system but the phases are macroscopic which manifests itself in a cloudy appearance as compared to the microscopic two phase copolymer which is transparent. Under an electron microscope, the microscopic two phase nature of the copolymers can be observed and an X-ray diffraction pattern of these co-polymers results in two distinct halos characteristic of two distinct amorphous phases.

Certain of the two phase copolymers are elastomeric without having to be cured. These copolymers have the general formulas $(AB)_n$ and A—B—A wherein A represents the polyarylene polyether chain, B the siloxane chain and $n$ is an integer having a value of 1 or greater which indicates the degree of polymerization.

In the two phase copolymer, the siloxane chain and the polyarylene polyether chain each has a molecular weight such that the copolymer is a two phase polymeric material having two glass transition temperatures. The exact minimum molecular weights for each chain in the copolymer where this phenomenon occurs are somewhat difficult to determine but are believed to lie within the range of from about 1500 to about 5000. Regardless of molecular weight, a two phase copolymer has two distinct phases and two distinct glass transition temperatures. Thus a two phase copolymer can contain a siloxane chain having a minimum molecular weight within the range of from about 1500 to about 5000 and a maximum molecular weight of up to about 100,000 or greater and a polyarylene polyether chain having a minimum molecular weight within the range of from about 1500 to about 5000 and a maximum molecular weight of up to about 50,000 or greater. The two phase copolymers contain from 10 to 90 percent by weight of siloxane and from 90 to 10 percent by weight of polyarylene polyether. Two phase elastomeric copolymers contain at least 50 percent by weight siloxane and have a tensile modulus (ASTM D-638) of less than 100,000 p.s.i. and a tensile elongation (ATSM D-638) of at least 100 percent.

The preferred copolymers are linear. The preferred elastomeric copolymers contain at least 25 percent siloxane and each chain of the copolymer has a molecular weight of about 1000–20,000.

As stated above the copolymers used in this invention contain siloxane chains having at least two siloxane units represented by the formula:

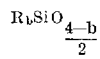

wherein R is a monovalent hydrocarbon group, a divalent organic group (e.g., a divalent hydrocarbon group, a hydroxy-substituted divalent hydrocarbon group or a divalent hydrocarbon group linked to a carbonyl group) or ether oxygen (—O—) and $b$ has a value from 1 to 3 inclusive. Each divalent organic group or ether oxygen links a siloxane chain of the copolymer to a polyarylene polyether chain of the copolymer. The groups represented by R can be the same or different in any given siloxane unit or throughout the siloxane chain of the copolymers and the value of $b$ in the various siloxane units in the siloxane chain of the copolymer can be the same or different. Each siloxane chain of the copolymer contains at least one unit represented by Formula 2 wherein at least one unit represented by R is a divalent organic group or ether oxygen.

Illustrative of the monovalent hydrocarbon groups that are represented by R in Formula 2 are the alkyl groups (for example, the methyl, ethyl n-propyl, isopropyl, n-butyl, secbutyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1-3-butadienyl, allenyl groups), the cycloalkenyl groups (for example, the cyclopentyl, cyclohexenyl groups), the alkynyl groups (for example, the ethynyl, propargyl groups), the aryl groups (for example, the phenyl, naphthyl, phenanthrenyl, anthracenyl groups), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups). If desired such monovalent hydrocarbon groups can contain substituent functional groups replacing one or more of the hydrogens or carbons of the monovalent hydrocarbon moiety and illustrative of such substituted monovalent hydrocarbon groups are:

| | |
|---|---|
| Bromomethyl | $-CH_2Br$ |
| 1-chlorovinyl | $-CCl=CH_2$ |
| 3,3,3-trifluoropropyl | $-CH_2CH_2CF_3$ |
| Pentafluoroethoxy ethyl | $-CH_2CH_2OCF_2CF_3$ |
| 3-chloropropyl | $-CH_2CH_2CH_2Cl$ |
| 3-hydroxypropyl | $-CH_2CH_2CH_2OH$ |

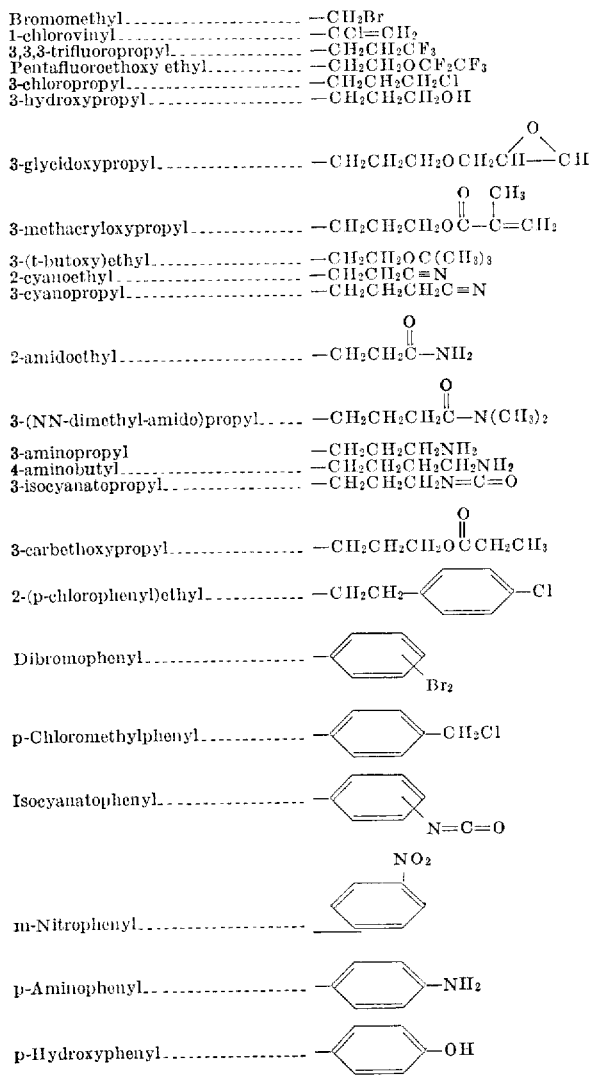

| | |
|---|---|
| 3-(t-butoxy)ethyl | $-CH_2CH_2OC(CH_3)_3$ |
| 2-cyanoethyl | $-CH_2CH_2C\equiv N$ |
| 3-cyanopropyl | $-CH_2CH_2CH_2C\equiv N$ |

| | |
|---|---|
| 3-aminopropyl | $-CH_2CH_2CH_2NH_2$ |
| 4-aminobutyl | $-CH_2CH_2CH_2CH_2NH_2$ |
| 3-isocyanatopropyl | $-CH_2CH_2CH_2N=C=O$ |

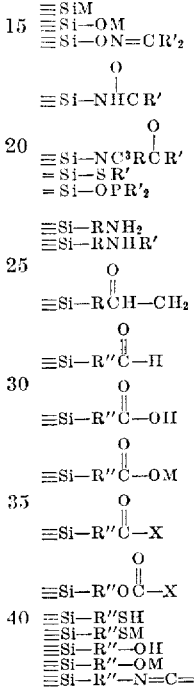

The structure of the divalent organic group represented by R in Formula 2 is dependent upon the type of reaction involved in producing the siloxane-polyarylene polyether copolymer. The copolymers can be produced by any number of reactions thereby giving rise to a variety of divalent organic groups linking the siloxane chain to the polyarylene polyether chain of the copolymer. Typical of such reactions showing only the reactive groups on the siloxane and polyarylene polyether chains and the resulting link are the following:

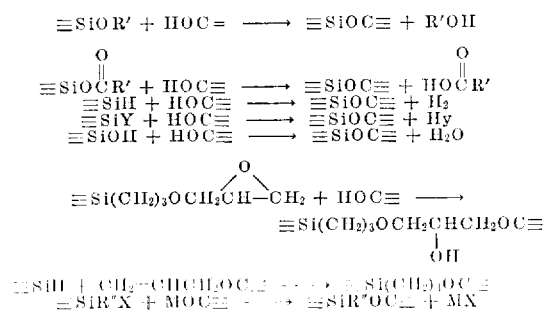

In the above equations R′ represents a monovalent alkyl or aryl group, y represents a halogen atom or amino group, such as $-NH_2$, $-NHZ$, and $-NZ_2$ wherein Z is a monovalent hydrocarbon radical, X represents a halogen atom, i.e., bromine, chlorine, fluorine or iodine, M is an alkali metal such as sodium or potassium, and R″ is a divalent hydrocarbon radical, preferably a saturated aliphatic radical such as methylene, ethylene, propylene, n-butylene, isoamylene, hexamethylene and the like.

In addition, many other reactive groups can replace those shown in the above equations on either the siloxane or polyarylene polyether chains, for example on the siloxane chain:

$\equiv SiM$
$\equiv Si-OM$
$\equiv Si-ON=CR'_2$ $\equiv Si-NHCR'$ (with O)

$\equiv Si-NC^3RCR'$ (with O)
$=Si-SR'$
$=Si-OPR'_2$ $\equiv Si-RNH_2$
$\equiv Si-RNHR'$ $\equiv Si-RCH-CH_2$ (with O epoxide)

$\equiv Si-R''C-H$ (with O)

$\equiv Si-R''C-OH$ (with O)

$\equiv Si-R''C-OM$ (with O)

$\equiv Si-R''C-X$ (with O)

$\equiv Si-R''OC-X$ (with O)

$\equiv Si-R''SH$
$\equiv Si-R''SM$
$\equiv Si-R''-OH$
$\equiv Si-R''-OM$
$\equiv Si-R''-N=C=O$ and for example on the polyarylene polyether chain;

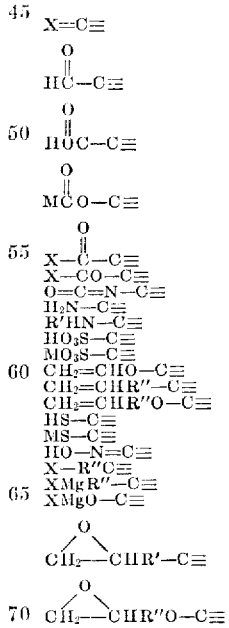

wherein R′, R″, X and M are as defined previously. Appropriately selected pairs of the foregoing reactive groups can be reacted to copolymerize the siloxane and polyarylene polyether chains.

Illustrative of the divalent hydrocarbon groups represented by R in Formula 2 are the alkylene groups (such as the methylene, ethylene, propylene, butylene, 2,2-dimethyl-1,3-propylene and decylene groups), the arylene groups (such as the p-phenylene and p,p'-diphenylene groups) and the alkarylene groups (such ads the phenyl methylene and phenylethylene groups). Preferably, the divalent hydrocarbon groups are alkylene groups containing from two to four successive carbons, p-phenylene groups, and phenylmethylene groups. Siloxane units containing divalent hydrocarbon groups as substituents are illustrated by groups having the formulae:

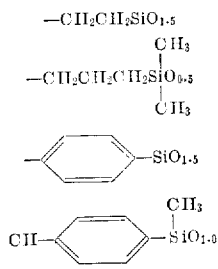

These divalent hydrocarbon groups are linked to a silicon atom of the siloxane chain of the copolymer by a silicon-to-carbon bond.

The copolymers can obtain siloxane units represented by Formula 2 wherein either the same hydrocarbon groups are attached to the silicon atoms (e.g., the dimethylsiloxy, diphenylsiloxy and diethyldsiloxy groups) or different hydrocarbon groups are attached to the silicon atoms (e.g., the methylphenylsiloxy, methylvinylsiloxy, bromomethyldimethylsiloxy, metaaminophenyl dimethylsiloxy and the ethylphenylvinylsiloxy groups). These copolymers can contain one or more types of siloxane units that are represented by Formula 2 provided that at least one group has at least one divalent hydrocarbon substituent. By way of illustration; only p-phenylene dimethylsiloxy groups

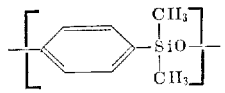

can be present in the siloxane chain or the copolymer can contain more than one type of siloxane units, e.g., the copolymer can contain both p-phenylenedimethylsiloxy units and diphenylsiloxy units, or the copolymer can contain p-phenylene dimethylsiloxy units, diphenylsiloxy units, dimethylsiloxy units, and methylvinylsiloxy units. The copolymers can contain trifunctional siloxane units (e.g., monomethylsiloxane groups, $CH_3SiO_{1.5}$), difunctional siloxane units (e.g., dimethylsiloxane units, $(CH_3)_2SiO-$), monofunctional siloxane units (e.g., bromomethyl dimethylsiloxane units, $$BrCH_2(CH_3)_2SiO_{0.5}$$

or combinations of these types of siloxane units having the same or different substituents. According to the average functionality of the siloxane units, the siloxane chain can be predominantly linear cyclic, branched or cross-linked or can have combinations of these structures. Preferably the siloxane chains of the copolymers are linear or predominantly linear having small amounts of branching.

The residua D and D' in Formula 3 are the same as the residua E and E', respectively, in Formula 1. The polyarylene polyether chains of Formula 3 are prepared in the same manner as the polyarylene polyethers of Formula 1 except that the reactive groups —OM or —X, where M and X are as defined above, can be placed at each end of the polymer chain by using a molar excess of dihydric phenol in the case of —OM groups or a molar excess of dihalobenzenoid compound in the case of —X groups. These reactive groups can be reacted directly with reactive groups on the siloxane chain as indicated above or first reacted with a compound which introduces another different reactive group onto the polymer siloxane chain also indicated above. The molecular weight of the polyarylene polyether chains can be controlled by varying the amounts of starting monomers.

Admixing the polymer constitutents can be accomplished in any manner as long as a thorough blending of the copolymer and polyarylene polyether is obtained. For example, admixing may be accomplished by a variety of methods normally employed for incorporation of plasticizers or fillers into thermoplastic materials including but not limited to mixing rolls, doughmixers, Banbury mixers, extruders, and other mixing equipment. The resulting mixtures may be handled in any conventional manner employed for the fabrication or manipulation of thermoplastic polymers. The mixtures can be molded using compression, injection, calendering and extrusion techniques. Alternatively, the admixing may be accomplished by mixing solutions of the two polymers which may thereafter be treated with a non-solvent to effect coprecipitation. Precipitated mixture may then be recovered in a dry state after filtration to remove the nonsolvent and final evaporation of residual solvent. Dry blending a mixture of the individual polymers followed by thermal fusion is a convenient means for producing a conventional molding compound. In this procedure, the dry blend may be extruded and chopped into pellets for subsequent use in injection molding procedures.

It has been found that the incorporation of from 0.1 to about 25 percent by weight, based on the weight of the polymer mixture, of finely divided silica promotes the formation of a homogeneous mixture.

The mixtures of this invention may contain other additives to plasticize, extend, lubricate, prevent oxidation or lend color to the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed with various fillers to make molded parts and articles such as gear, ratchets, bearings, cams, impact parts, gaskets, valve seats, bottles, containers, and the like. They can be used to prepare molded, calendered or extruded articles, films, coatings, threads, filaments, tapes and the like. They can be applied to a broad spectrum of uses in form of sheets, rods, tapes and the like and are useful in electrical applications.

Because of the adhesive characteristics of the mixtures of this invention, they can be advantageously employed in one or more decorative, protective, structural or bonding capacities to provide structural elements comprising an adherent and an adherent mixture of copolymer and polyarylene polyether as described herein.

The terms "structural element" and "structural elements" as used herein refer to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherent, such as a substrate and an adhering layer of polymeric mixture as in a two-ply laminate or a coated substrate; structural elements comprising an interlayer of polymeric mixture sandwiched between and adhered to two similar or dissimilar adherends or laminae as in a plural ply laminate; structural elements comprising a polymeric mixture matrix surrounding and adhered to as a bond and/or a support for variously shaped and sized adherents such as articles of varying porosities, for example, as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass and wood and is absent in polyethylene or because of surface treatment of cleanliness or for any any other reason.

Adherends having a tangible surface or surfaces preferably a tangible wettable surface or surfaces, to which polyarylene polyether-copolymer mixtures readily adhere include metals, polar materials, vitreous materials, proteinaceous materials, cutaneous materials, cellulosic materials, natural resins, synthetic organic polymeric material, non-metallic materials, and the like. Adherends can be particulate, granular, fibrous, filamentary, ropy, woven, nonwoven, porous, nonporous, rigid and nonrigid.

Films formed from the mixtures of this invention by conventional techniques are useful as wrapping or packaging materials, as liners, for containers, covers, closures, and the like, as electrical insulating tapes, pipe coverings, and the like.

Because of their desirable electrical properties, the mixtures of this invention can be used as an insulating material for electrical conductors such as wire and cable, as slot insulation in dynamelectric machines, as surface coverings for appliances and the like, as coatings for rods and the like, in wire enamels, varnishes, paints and the like.

The following examples are intended to further illustrate the present invention without limiting the same in any manner. Parts and percentages are given by weight unless indicated otherwise.

Glass transition temperature ($T_g$) commonly referred to as the second order phase transition temperature, refers to the inflection temperatures found by plotting the resilience (recovery from one percent elongation) of a film ranging in thickness from 3 to 15 mils against the temperature. See Brown, Textile Research Journal, 25, 891 (1955).

Reduced viscosity (RV) is determined by dissolving a 0.2 gram sample of thermoplastic polyarylene polyether in chloroform in a 100 ml. volumetric flask so that the resultant solution measures exactly 100 ml. at 25° C. in a constant temperature bath. The viscosity of 3 ml. of the solution which has been filtered through a sintered glass funnel is determined in a viscometer at 25° C. Reduced viscosity values are obtained from the equation:

$$\text{Reduced viscosity} = \frac{t_s - t_0}{c \cdot t_0}$$

$t_s$ = efflux time of solvent
$t_0$ = efflux time of polymer solution
$c$ = concentration of polymer solution.

EXAMPLE 1

Polyarylene polyether general procedure

In a 250 ml. flask equipped with a stirrer, thermometer, a water cooled condenser and a Dean-Stark moisture trap filled with benzene, there is placed 11.42 grams of 2,2-bis(4-hydroxyphenyl)propane (0.05 mole), 13.1 grams of 42.8% potassium hydroxide solution (0.1 mole KOH), 50 mil. of dimethylsulfoxide and 6 ml. benzene and the system purged with nitrogen to maintain an inert atmosphere over the reaction mixture. The mixture is refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture is cooled and 14.35 grams (0.05 mole) of 4,4'-dichlorodiphenylsulfone is added followed by 40 ml. of anhydrous dimethylsulfoxide, all under nitrogen pressure. The mixture is heated to 130° and held at 130–140° C. with good stirring for 4–5 hours. The viscous, orange solution is poured into 300 ml. water, rapidly circulating in a Waring Blendor, and the finely divided white polymer is filtered and then dried in a vacuum oven at 100°, for 16 hours. The yield is 22.2 g. (100%) and the reaction is 99% complete based on a titration for residual base.

The polymer has the basic structure

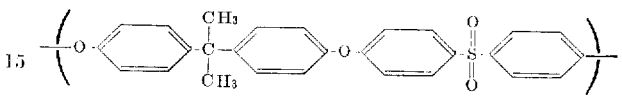

EXAMPLES 2–8

Preparation of copolymer: polyarylene polyether block general procedure

The desired amount of dihydric phenol is charged to a flask containing a solvent mixture of monochlorobenzene and dimethyl sulfoxide. The phenol is converted to the disodium salt in situ by adding the required amount of NaOH. The system is dehydrated by heating and removing the monochlorobenzene-water azeotrope. The desired amount of dihalo benzenoid compound is then added and reacted with the sodium salt of the phenol at above 140° C. The polymer is recovered by precipitating, filtering, washing and drying. The molecular weight of the polymer is controlled by the amounts of monomers used and to produce a hydroxy terminated polymer a molar excess of dihydric phenol is employed and, for a halo terminated polymer, a molar excess of benzenoid compound. Where an excess of dihydric phenol is used, the polymer is treated with acid such as HCl, oxalic acid, etc., to convert the terminal —ONa groups to —OH groups.

Copolymer general procedure

A four-neck, 500 ml. flask is fitted with a mechanical stirrer, a reflux condenser, a nitrogen inlet and stopcock. After heating to dry the apparatus and flushing with dry nitrogen, the desired amount of hydroxy or halo terminated polyarylene polyether is charged to the flask with sufficient solvent to dissolve the polymer. Suitable solvents include tetrahydrofuran, chlorobenzene, and the like. A portion of the solvent is then distilled out to remove any traces of moisture. While refluxing, the desired amount of polysiloxane having terminal groups capable of reacting with the terminal groups of the polyarylene polyether is added slowly. The block copolymer is isolated by removing the solvent by suitable techniques such as flash distillation under vacuum and the like. Polymers of the $(AB)_n$ type, wherein A represents the polyarylene polyether chain and B the siloxane chain are made using substantially equimolar amounts of A and B. An A–B–A type polymer is made using two moles of A for each mole of B. Conversely, a B–A–B type polymer is made using two moles of B for each mole of A.

In these examples, —OH terminated polyarylene polyether is prepared following the general procedure from a molar excess 2,2'-bis(4-hydroxyphenyl)propane, also known as bisphenol A, and 4,4'-dichlorodiphenyl sulfone and has the repeating unit

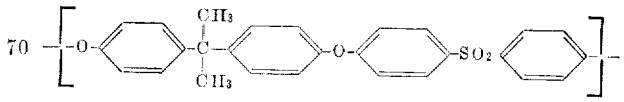

Block copolymers having two $T_g$'s are then prepared following the general procedure using bis(dimethylamine)

terminated polydimethylsiloxane. Results are summarized in the following table.

| Example No. | Polyarylene polyether molecular weight | Polysiloxane molecular weight | Percent siloxane in copolymer | RV of copolymer [1] | Block copolymer properties ||||| |
|---|---|---|---|---|---|---|---|---|---|
| | | | | | Tensile modulus, p.s.i. | Tensile strength, p.s.i. | Percent elongation | $T_g$ | °C. |
| 2 | 9,300 | 4,900 | 40.5 | 0.40 | 29,000 | 2,700 | 150 | −100 | +175 |
| 3 | 4,700 | 5,100 | 57.3 | 0.83 | 20,000 | 2,400 | 350 | −100 | +175 |
| 4 | 4,600 | 7,500 | 66.9 | 0.64 | 900 | 1,300 | 300 | ∼−100 | +175 |
| 5 | 4,700 | 9,800 | 73.1 | 0.61 | 100 | 600 | 350 | ∼−100 | +180 |
| 6 | 4,700 | 350 | 10.7 | 0.41 | 240,000 | 6,000 | 5 | +125 | |
| 7 | 6,600 | 1,700 | 24.2 | 1.14 | 170,000 | 4,700 | 12 | +150 | |
| 8 | 4,700 | 1,700 | 35.0 | 0.33 | 151,000 | 5,400 | 3 | +140 | |

[1] R.V. of copolymer determined at 0.2 g./dl. in dichloromethane at 25° C.

The block copolymers in Examples 2–5 are of the $(AB)_n$ type, show a two-phase nature under an electron microscope, have two $T_g$'s and each is a thermoplastic elastomer without having to be cured. The copolymers of Examples 6–8 are one phase materials having a single $T_g$.

EXAMPLES 9–16

Blending procedure

Polyarylene polyether prepared as in Example I and having an RV in chloroform of 0.50 is mixed with various amounts of the block copolymers of Examples 2–8 in a Banbury mixer. The polyarylene polyether is first fluxed in the mixer followed by addition of the copolymer. The resultant mixtures are granulated and then compression molded at 550° F. and injection molded at 700° F. into bars for testing. Excellent processing performance is observed during injection molding. Results are summarized in the following table: Tensile properties are determined according to ASTM D–638, Izod Impact according to ASTM D–256 and the heat distortion temperature according to ASTM D–648 at 264 p.s.i.

EXAMPLE 18

Thermoplastic polyarylene polyether composed of recurring units having the formula

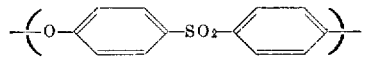

is prepared from 4,4′-dihydroxydiphenylsulfone and 4,4′-dichlorodiphenylsulfone according to the procedure of Example 1. A mixture prepared from this polymer and 3 percent of the copolymer of Example 2 exhibits an improvement in notched impact strength and an improvement in resistance to environmental stress cracking as compared to the unmodified polymer.

EXAMPLE 19

Thermoplastic polyarylene polyether composed of recurring units having the formula

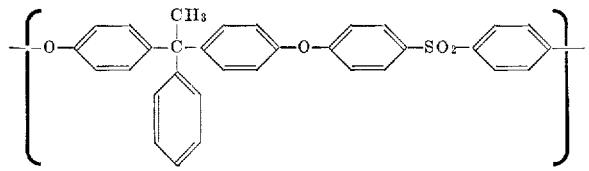

| Example No. | Copolymer from example | Percent of copolymer | Izod. impact, ft.-lbs./in. || Tensile properties |||| Heat distortion temperature, °C. |
|---|---|---|---|---|---|---|---|---|---|
| | | | Compression molded bar | Injection molded bar | Impact, ft.-lbs./in.³ | Strength, p.s.i. | Modulus, p.s.i. | Percent elongation | |
| 9 | 3 | 5 | 21.1 | 19.0 | 420 | 9,170 | 342,000 | 68 | 165.5 |
| 10 | 3 | 25 | | 18.7 | 370 | 6,460 | 247,000 | 110 | 160.5 |
| 11 | 7 | 5 | 1.6 | 1.5 | 427 | 10,200 | 351,000 | 30 | 165.9 |
| 12 | 3 | 10 | 17.3 | 16.4 | 397 | 8,250 | 299,000 | 63 | 169.4 |
| 13 | 3 | 3 | 18.5 | | | | | | |
| 14 | 3 | 5 | | 10.6 | | 9,680 | 336,000 | 12 | 164.0 |
| 15 | 2 | 5 | 17.7 | 2.5 | 386 | 9,560 | 351,000 | 75 | 169.4 |
| 16 | 5 | 3 | 2.5 | | | | | | |
| Control | | 0 | | 1.3 | 425 | 10,200 | 360,000 | 50–100 | 173 |

The mixtures of Examples 9–16 all show good heat stability. The mixture of Example 11 is clear (indicating complete compatibility) and exhibits an increased melt flow (ASTM D–1238—indicating an easier molding material). The tensile properties and heat distortion temperature values show that no substantial change in the thermal and mechanical properties has occurred as a result of adding the siloxane-polyarylene polyether copolymers while the impact strengths are greatly improved.

EXAMPLE 17

The mixture of Example 9 is tested in the form of 5″ x ½″ x ⅛″ bars for resistance to environmental stress cracking against an unmodified control (polyarylene polyether alone prepared as in Example 1) with the following results:

is prepared from the bisphenol of acetophenone and 4,4′-dichlorodiphenylsulfone according to the procedure of Example 1. A mixture prepared from this polymer and 7 percent of the copolymer of Example 4 exhibits an improvement in notched impact strength and an improvement in resistance to environmental stress cracking as compared to the unmodified polymer.

EXAMPLE 20

Thermoplastic polyarylene polyether composed of recurring units having the formula

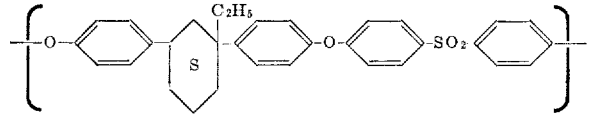

is prepared from the bisphenol of vinyl cyclohexene (prepared by an acid catalyzed condensation of 2 moles of

| Environment | Stress, p.s.i. | Time to Rupture |||
|---|---|---|---|---|
| | | Temp., °F. | Example 15 | Control |
| 1/1 Prestone (Reg. TM)/water | 2,000 | 210 | >7 days | 24 hrs. |
| ASTM Oil #3 | 1,000 | 210 | >7 days | 48 hrs. |
| Mil Oil H 5606 | 1,000 | 210 | >7 days | 18 hrs. |
| Cellosolve (Reg. TM) | 1,000 | 77 | >24 hrs. | 24 hrs. |
| Dioctylphthalate | 3,000 | 77 | >72 hrs. | 72 hrs. | phenol with one mole of vinyl cyclohexene) and 4,4'-dichlorodiphenylsulfone according to the procedure of Example 1. A mixture prepared from this polymer and 20 percent of the copolymer of Example 5 exhibits an improvement in notched impact strength and an improvement in resistance to environmental stress cracking as compared to the unmodified polymer.

EXAMPLE 21

Thermoplastic polyarylene polyether composed of recurring units having the formula

is prepared from hydroquinone and 4,4'-dichlorodiphenylsulfone according to the procedure of Example 1. A mixture prepared from this polymer and 13 percent of the copolymer of Example 6 exhibits an improvement in notched impact strength and an improvement in resistance to environmental stress cracking as compared to the unmodified polymer.

EXAMPLE 22

Thermoplastic polyarylene polyether composed of recurring units having the formula

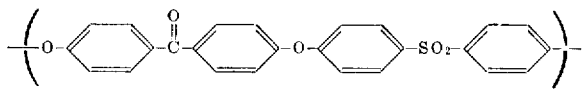

is prepared from 4,4'-dihydroxybenzophenone and 4,4'-dichlorodiphenylsulfone according to the procedure of Example 1. A mixture prepared from this polymer and 30 percent of the copolymer of Example 8 exhibits an improvement in notched impact strength and an improvement in resistance to environmental stress cracking as compared to the unmodified polymer.

EXAMPLE 23

Thermoplastic polyarylene polyether composed of recurring units having the formula

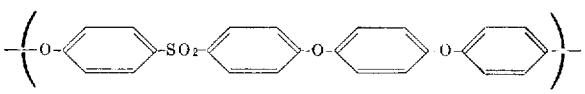

is prepared from 4,4'-dihydroxydiphenylether and 4,4'-dichlorodiphenylsulfone according to the procedure of Example 1. A mixture prepared from this polymer and 2 percent of the copolymer of Example 3, exhibits an improvement in notched impact strength and an improvement in resistance to environmental stress cracking as compared to the unmodified polymer.

EXAMPLE 24

Thermoplastic polyarylene polyether composed of recurring units having the formula

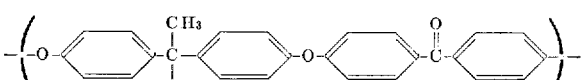

is prepared from 2,2'-bis-(4-hydroxyphenyl)propane and 4,4'-difluorobenzophenone according to the procedure of Example 1. A mixture prepared from this polymer and 30 percent of the copolymer of Example 3 exhibits an improvement in notched impact strength and an improvement in resistance to environmental stress cracking as compared to the unmodified polymer.

EXAMPLE 25

Example 9 is duplicated with the addition of 2 percent finely divided silica. The blend is injection molded, reground, injection molded a second time, reground again and injection molded a third time. After each molding the Izod impact strength is measured with the following results:

| Molding | Izod impact ft.-lbs./in. |
|---------|--------------------------|
| first   | 17.1                     |
| second  | 16.8                     |
| third   | 16.0                     |

This example demonstrates the good processing stability of the mixtures of this invention.

EXAMPLE 26

Following the general procedures of Examples 2–8, a two-phase, elastomeric, A–B–A type copolymer is prepared from a chlorine terminated polyarylene polyether having a molecular weight of 12,000 and composed of recurring units having the formula in Example 22 and a bis mercaptoalkyl-terminated polymethylphenyl-siloxane having a molecular weight of 12,000 to yield a copolymer containing 33% siloxane. A mixture prepared from the polyarylene polyether of Example 1 and 60 percent of this copolymer exhibits an improvement in resistance to environmental attack.

EXAMPLE 27

Following the general procedure of Examples 2–8, a two-phase, elastomeric $(AB)_n$ type copolymer is prepared from the polyarylene polyether block of Examples 2–8 having a molecular weight of 4700 and a bis(isocyanatopropyl) terminated copolymer containing 97 percent dimethylsiloxane units and 3 percent vinylmethylsiloxane units having a molecular weight of 5000 to yield a copolymer containing 50 percent siloxane. A mixture prepared from the polyarylene polyether of Example 1 and 50 percent of this copolymer can be crosslinked by conventional methods and exhibits an improvement in resistance to environmental attack and even more so when crosslinked.

In one embodiment, the mixtures of this invention are advantageously formed into sheets which are subsequently formed against an original shape such as a copper etched printing plate to form a matrix. The depth of an impression made in a matrix is more commonly referred to in the art as a "floor." Thus a matrix having an impression 30 mils deep is referred to as a matrix having 30 mil floor. In the copending application of J. B. Wheeler III, Ser. No. 365,797, filed May 7, 1964, now U.S. Pat No. 3,380,878, granted Apr. 30, 1968, there is described a thermoplastic matrix formed from a sheet of polyarylene polyether as described herein. The manner of forming such a matrix and the molding of duplicates from the matrix are also described in said application. It has been found however that when sheets of polyarylene polyether are formed into a matrix, because of its low notched impact strength, the matrix tends to crack and even break in extreme cases when it is separated from the original original against which it was formed. It has now been discovered that matrixes formed from the mixtures of this invention will not break or crack when separated from an original.

What is claimed is:

1. Polymeric mixture characterized by improved impact strength and improved resistance to environmental stress cracking comprising a linear thermoplastic polyarylene polyether composed of recurring units having the formula:

wherein E is a residium of a dihydric phenol and E' is the residium of a benzenoid compound having an inert electron withdrawing group in at least one of the positions ortho and para to the valence bonds, and where both of said residua are valently bonded to the ether oxygen through aromatic carbon atoms and from about 0.1 to about 99.9 percent by weight based on the weight of the polymer mixture, of a siloxane-polyarylene polyether copolymer comprising (A) at least one siloxane chain having at least two siloxane units represented by the formula:

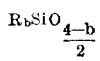

wherein R is a monovalent hydrocarbon group, a divalent organic group or ether oxygen (—O—) and $b$ has a value from 1 to 3 inclusive, said siloxane chain containing at least one of said siloxane units wherein at least one R is a divalent organic group or ether oxygen which links the siloxane chain to a polyarylene polyether chain by a carbon to silicon bond when R is a divalent organic group or by an aryloxy to silicon bond when R is ether oxygen, and (B) at least one linear thermoplastic polyarylene polyether chain composed of recurring units having the formula

—O—D—O—D'— wherein D and D' are the same as E and E' respectively.

2. Mixture defined in claim 1 wherein said polyarylene polyethers are composed of recurring units having the formula:

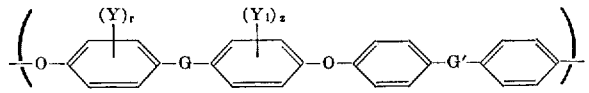

wherein G represents a member of the group consisting of a bond between aromatic carbon atoms and a divalent connecting radical and G' represents a member of the group consisting of sulfone, carbonyl, vinyl, sulfoxide, azo, saturated fluorocarbon, organic phosphine oxide and ethylidine groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

3. Mixture defined in claim 1 wherein said polyarylene polyethers are composed of recurring units having the formula:

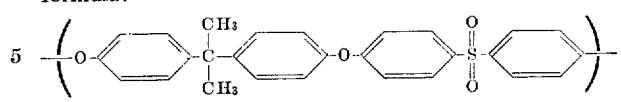

4. Mixture defined in claim 1 wherein said polyarylene polyethers are composed of recurring units having the formula:

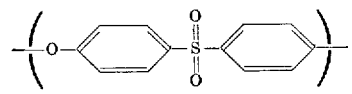

5. Mixture defined in claim 1 wherein said siloxane chain and said polyarylene polyether chain each have a molecular weight such that said copolymer is a two-phase polymeric material.

6. Mixture defined in claim 3 wherein said siloxane chain is polydimethylsiloxane and said copolymer is an elastomeric two-phase polymeric material.

7. Mixture of claim 1 wherein from about 0.1 to about 25 percent by weight based on the weight of the mixture of finely divided silica is present.

8. Mixture of claim 1 wherein said siloxane chain contains at least 1 mole percent of olefinic unsaturation.

9. A structure molded from the mixture of claim 1.

10. A matrix formed from a sheet molded from the mixture of claim 1.

References Cited

UNITED STATES PATENTS 3,423,479   1/1969   Hendricks _____ 260—824

SAMUEL H. BLECH, Primary Examiner

U.S. Cl. X.R.

101—401.2; 117—123, 132, 138.8, 141, 143, 161, 230, 232; 260—46.5, 47, 49, 448.2, 824